United States Patent [19]

Ziegler et al.

[11] Patent Number: 4,599,816
[45] Date of Patent: Jul. 15, 1986

[54] APPARATUS FOR ILLUMINATING PASSIVE LIQUID CRYSTAL DISPLAYS (LCD'S)

[75] Inventors: Wolfgang Ziegler, Fürth; Hans Petermann, Nuremberg, both of Fed. Rep. of Germany

[73] Assignee: Robert Bosch GmbH, Stuttgart, Fed. Rep. of Germany

[21] Appl. No.: 686,258
[22] PCT Filed: Dec. 24, 1984
[86] PCT No.: PCT/DE83/00221
  § 371 Date: Dec. 7, 1984
  § 102(e) Date: Dec. 7, 1984
[87] PCT Pub. No.: WO84/04382
  PCT Pub. Date: Nov. 8, 1984

[30] Foreign Application Priority Data

Apr. 22, 1983 [DE] Fed. Rep. of Germany ....... 3314631

[51] Int. Cl.$^4$ ............................................. G09F 13/22
[52] U.S. Cl. ........................................ 40/544; 362/25
[58] Field of Search ................... 40/542, 544, 564; 362/21, 22, 23, 24

[56] References Cited

U.S. PATENT DOCUMENTS

| 2,858,632 | 11/1958 | Caserio et al. | 40/544 |
| 3,038,271 | 6/1962 | MacHutchin et al. | 40/542 |
| 3,182,415 | 5/1965 | Brooks | 40/544 |
| 3,978,599 | 9/1976 | Berger | 40/542 |

Primary Examiner—Robert Peshock
Assistant Examiner—Wenceslao J. Contreras
Attorney, Agent, or Firm—Frishauf, Holtz, Goodman & Woodward

[57] ABSTRACT

An apparatus for illuminating passive liquid crystal displays is proposed, in which bright display elements appear in negative contrast against a dark background. Masks (21) in the vicinity of the support points (18) of the liquid crystal display (10) are supposed to effectively disappear from the apparent image of the display. To this end, a photoconductor (22) into which light outside the display enters is disposed in front of the liquid crystal display (10), and this photoconductor has surface regions (22a), in the vicinity of the masks (21), which put out a portion of the light toward the front (drawing figure).

11 Claims, 1 Drawing Figure

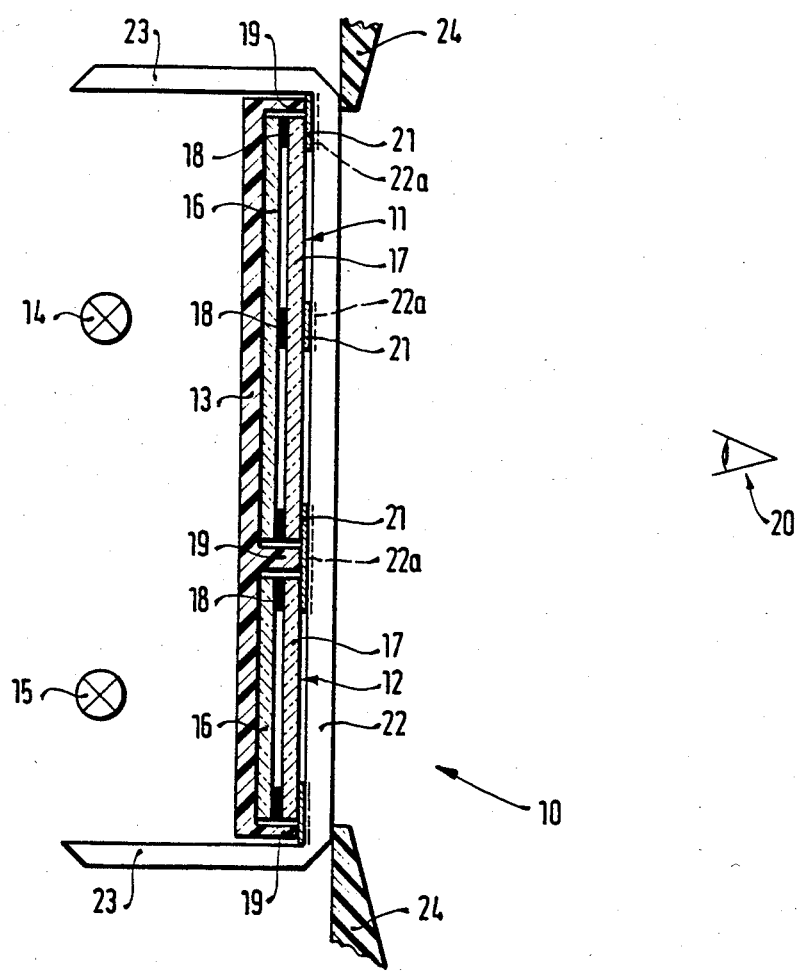

though it is not shown here, has an anti-reflection layer applied to its back side, which prevents reflection of the light carried by the photoconductor 22.

APPARATUS FOR ILLUMINATING PASSIVE LIQUID CRYSTAL DISPLAYS (LCD'S)

The invention relates to an apparatus for illuminating passive liquid crystal displays.

BACKGROUND

In a known liquid crystal display for a motor vehicle, the light striking the LCD cell from the internal lighting means is passed through only in the triggered areas of the cell. In the non-triggered areas, however, the light is predominantly absorbed, so that the information is presented in negative contrast. Bright characters appear against a dark background. Since the two glass plates of the LCD cell, located one immediately above the other, have a plurality of support points, and since furthermore the electrodes vapor-deposited onto the glass plates partly intersect one another, the appearance of the dark background of the display is not uniform. If a plurality of LCD cells, guided on struts, are disposed beside one another, then these struts between the individual displays must be appropriately colored to match the dark background, or like the support points and electrode crossings they must be masked by colored masks. Such colored masks, because of the various transmission properties of the materials in the areas to be masked, must be black, or in other words must have a high refractive index. On the other hand, however, since the LCD cells in the optically blocked, non-triggered areas have a not inconsiderable amount of afterglow, the background in these areas appears variously bright, depending on the brightness of the internal lighting means; and so depending on this variable brightness of the background, the masked areas of the LCD displays and the guide struts are variably prominent in appearance.

With the present invention, the object is to match the masked areas optically to the non-triggered areas of the LCD cell such that regardless of the internal lighting means they present a homogeneous appearance for the liquid crystal displays.

THE INVENTION

Briefly, the apparatus according to the invention, has photoconductor means for lighting the masked areas of the liquid crystal display, in which output of the internal light takes place, the order of magnitude of which is selected to match the afterglow in the blocked areas of the liquid crystal display. As a result, the brightness in the area of the masks when the illumination is variable varies in the same manner as that of the blocked areas of the liquid crystal display, so that the display assures a homogeneous appearance for all light conditions.

By suitable configuration of the photoconductor and use of a common light source, advantageous further embodiments of and improvements to the basic invention are possible. For instance, to avoid parallax it is advantageous if the surface areas of the photoconductor that output the light toward the front are located on the side of the photoconductor facing the LCD cell. In the simplest possible manner, the surface of the photoconductor is roughened in the surface regions giving out, or outputting the light.

DRAWING

An exemplary embodiment of the invention is shown in the drawing and explained in further detail in the ensuing description. The drawing shows a liquid crystal display, having a photoconductor in accordance with the invention, in cross section.

DETAILED DESCRIPTION OF THE EXEMPLARY EMBODIMENT

The drawing shows a liquid crystal display 10 in the dashboard of a motor vehicle, which comprises two LCD cells 11 and 12 disposed beside one another. The LCD cells 11 and 12 are inserted into a transparent plastic frame 13, behind which two light sources in the form of incandescent bulbs 14 and 15 are disposed. The liquid crystal substance of the LCD cells 11 and 12 is located between two respective glass plates 16 and 17, which are spaced apart from one another by the desired distance by means of support points 18. For the individual display elements of the LCD cells 11 and 12. electrodes are vapor-deposited on the inside of each glass plate 16 and 17, which are bonded in a manner not visible via conductor tracks on two opposing sides of the LCD cells 11 and 12. The LCD cells 11 and 12 are guided laterally on struts 19 of the plastic frame 13. The struts 19 terminate at the front in the same plane as the LCD cells 11 and 12. The liquid crystal display 10 is readable from the front in negative contrast; the observer is represented symbolically by an eye 20. When the LCD cells 11 and 12 are triggered electrically, bright display elements appear against a dark background. On the front side of the liquid crystal display 10, in the vicinity of the electrode crossings which are not visible in the drawing and in the vicinity of the support points 18 and the struts 19, black masks 21 are applied, which have a high refractive index and accordingly allow no light to pass through. By means of these masks, it is intended that a uniform appearance of the liquid crystal display 10 be attained on its front side. The light from the internal lighting means 14, 15, striking the liquid crystal display 10, which, given a brightness control, varies depending on light conditions in the vehicle or in the surroundings, is not completely absorbed in the blocked areas of the LCD. However, since such afterglow does not occur at the masks 21, what is obtained by means of the masks is a variably dark background at the front of the liquid crystal display 10.

In order to balance out these variations, additional light is put out toward the front on the front side of the liquid crystal display 10 in the vicinity of the masks 21, so that in the vicinity of the masks 21 as well, a brightening of the background takes place. To this end, a photoconductor 22 of some transparent plastic, configured in a flat shape, is disposed in front of the entire liquid crystal display 10. The photoconductor 22 has an extension 23 at its outer edge on two opposing sides, protruding laterally beyond the liquid crystal display 10 toward the back. Beyond these extensions 23, the photoconductor 22 extends so far around the liquid crystal display 10 that a portion of the light from the incandescent bulbs 14 and 15 located behind the liquid crystal display 10 can enter into the photoconductor 22 there. In the vicinity of the masks 21, the photoconductor 22 is provided with surface regions 22 a, which put out toward the front a portion of the light introduced into the photoconductor 22. These surface regions 22a are located on the side of the photoconductor 22 facing the liquid crystal display 10. The output of the light is effected by roughening the surface of the photoconductor 22 at these surface regions 22a. The liquid crystal display 10 is inserted together with the photoconductor 22 into an opening in a dashboard housing 24, the edges of the photoconductor 22 being covered by the cockpit housing 24. Since the photoconductor 22 extends over two adjacent LCD cells 11 and 12 guided in the struts 19, there are light-outputting surfaces regions 22a located both in the vicinity of the support points 18 and in the vicinity of the struts 19 and the electrode crossings, not visible here.

The photoconductor 22 is disposed, with a small air gap, immediately in front of the LCD cells 11 and 12 and the masks 21, so that light introduced at the extensions 23 is distributed uniformly over the photoconductor 22. By means of the light-output surface regions 22a of the photoconductor 22, the masks 21 now apper brightened to the same extent, resulting in a homogeneous appearance on the front side of the liquid crystal display 10. If the dark background of the LCD cells 11 and 12 is now brightened by the brightness control, as a result of varying lighting conditions, then this also takes place to the same extent by means of the light-output surface regions 22a of the photoconductor 22 in the vicinity of the masks 21. As a result, it is assured that a homogeneous appearance of the display in negative contrast is generated, regardless of the light conditions at the liquid crystal display 10.

For the masks 21, a continuous black foil, stamped out in the vicinity of the visible portion of the LCD, is suitably used.

By roughening the surface regions 22a to a greater or lesser extent, the proportion of light to be put out can be matched to the afterglow of the LCD cells 11 and 12. Instead of roughening the surface, it is also possible to apply a colorless matte paint to the surface regions 22a on the surface of the photoconductor 22. In both cases, given a suitable matching of the light-output surface regions 22a of the photoconductor 22 to the afterglow of the LCD cells 11 and 2, the masks 21 effectively disappear from the liquid crystal display 10.

We claim:

1. A passive liquid crystal display (10) having bright display elements and a darker, homogeneously bright background, comprising at least one liquid crystal cell (11, 12) including liquid crystals retained between plates (16, 17), said liquid crystals forming said bright display elements when electrically triggered and incompletely dark background areas when not triggered;

a plurality of support elements (18) spacing said plates (16, 17) from each other;

a plurality of masks (21) disposed between a viewer (20) and said at least one cell (11, 12) and absorbing light emanating from said support elements (18), thereby producing substantially completely dark background areas;

wherein, in accordance with the invention, means (22, 22a) are provided, between said display (10) and said viewer (20), for equalizing the brightness of said incompletely dark and said completely dark background areas to produce a homogeneously bright background, said means including a photoconductor (22) transmitting light not emanating from said at least one liquid crystal cell (11, 12) to a surface region (22a) of said photoconductor (22) disposed between each said mask (21) and said viewer (20) and directing said light from each surface region (22a) outward toward the viewer (20).

2. A liquid crystal display in accordance with claim 1, further comprising means for commonly controlling the brightness of said non-triggered liquid crystal background areas and the brightness of said surface regions (22a).

3. A liquid cyrstal display in accordance with claim 2, wherein said means for commonly controlling brightness comprises at least one common light source (14, 15) disposed on a side of said at least one cell (11, 12) remote from the viewer (20) and providing both the light transmitted through said at least one cell (11, 12) to the viewer (20) and the light transmitted through said photoconductor (22) to said surface regions (22a) and thence to the viewer (20).

4. A liquid crystal display in accordance with claim 3, wherein said light transmitted to said surface regions (22a) is transmitted by internal reflection in said photoconductor (22).

5. A liquid crystal display in accordance with claim 1 wherein, to avoid parallax effects resulting from excessive displacement between a plane containing said surface regions (22a) and a plane containing light-emanating portions of said at least one cell (11, 12), said surface regions (22a) are disposed on a surface of said photoconductor remote from the viewer (20) and substantially adjacent to said at least one cell (11, 12).

6. A liquid crystal display in accordance with claim 1, wherein said surface regions (22a) comprise roughened areas on a surface of said photoconductor (22).

7. A liquid crystal display in accordance with claim 1, wherein said surface regions (22a) comprise areas on a surface of said photoconductor (22) to which a colorless matte paint has been applied.

8. A liquid crystal display in accordance with claim 1, wherein a plurality of liquid crystal cells (11, 12) and at least one strut (19) supporting said each cell in said display are provided, and wherein a mask (21) is disposed between each strut (19) and the viewer (20) and a surface region (22a) is disposed between each such mask (21) and the viewer (20).

9. A liquid crystal display in accordance with one of the foregoing claims, wherein said photoconductor (22) has at least one region (23) peripheral to said at least one liquid crystal cell (11, 12) and said peripheral region (23) forms reception surface for acceptance of the light transmitted to said surface regions (22a).

10. A liquid crystal display in accordance with claim 9, wherein said photoconductor (22) has a flat central region substantially parallel to said liquid crystal cell plates (16, 17) and said at least one peripheral region comprises two extensions (23) protruding away from the viewer (20) and laterally with respect to said at least one cell (11, 12).

11. A liquid crystal display in accordance with claim 1, wherein each liquid crystal cell (11, 12) includes a plurality of electrodes which intersect one another at crossings, and wherein a mask (21) is disposed between each electrode crossing and the viewer (20) and a surface region (22a) is disposed between each such mask (21) and the viewer (20).

* * * * *